United States Patent
Oishi

(10) Patent No.: US 11,155,219 B2
(45) Date of Patent: Oct. 26, 2021

(54) AUTOMOBILE DOOR TRIM

(71) Applicant: KASAI KOGYO CO., LTD., Kanagawa (JP)

(72) Inventor: Hiroshi Oishi, Isehara (JP)

(73) Assignee: KASAI KOGYO CO., LTD., Kanagawa (JP)

(*) Notice: Subject to any disclaimer, the term of this patent is extended or adjusted under 35 U.S.C. 154(b) by 105 days.

(21) Appl. No.: 16/637,696

(22) PCT Filed: Sep. 27, 2017

(86) PCT No.: PCT/JP2017/034853
§ 371 (c)(1),
(2) Date: Feb. 7, 2020

(87) PCT Pub. No.: WO2019/064359
PCT Pub. Date: Apr. 4, 2019

(65) Prior Publication Data
US 2021/0039567 A1 Feb. 11, 2021

(51) Int. Cl.
*B60R 13/02* (2006.01)
*B60N 2/75* (2018.01)
*H05B 1/02* (2006.01)

(52) U.S. Cl.
CPC ............ *B60R 13/0243* (2013.01); *B60N 2/75* (2018.02); *H05B 1/0236* (2013.01);
(Continued)

(58) Field of Classification Search
CPC ... B60N 2/27; B60R 13/0243; B60R 13/0237; B60R 2013/0281; B60R 13/02;
(Continued)

(56) References Cited

U.S. PATENT DOCUMENTS

| 5,125,815 A * | 6/1992 | Kargarzadeh | B29C 41/386 425/112 |
| 2007/0056957 A1 | 3/2007 | Diemer | |

FOREIGN PATENT DOCUMENTS

| DE | 10225292 A1 * | 12/2003 | ............. B60N 2/797 |
| DE | 102012021887 A1 * | 5/2014 | ............. B29C 43/18 |

(Continued)

OTHER PUBLICATIONS

International Search Report for International Application No. PCT/JP2017/034853 dated Nov. 14, 2017, Japan, 2 pages.

*Primary Examiner* — Lori L Lyjak
(74) *Attorney, Agent, or Firm* — United IP Counselors, LLC

(57) ABSTRACT

There is provided a door trim including: an armrest; an ornament member coupled to the armrest; and a planar heater configured to warm the armrest or the ornament member. The planar heater is disposed between a resin core member and a surface member which form the armrest or the ornament member, and includes a nonwoven fabric and a heating wire fixed to the nonwoven fabric. The nonwoven fabric includes first and second bonded parts and a connection part connecting between the first and second bonded parts. The second bonded part is routed to be disposed on the back surface side of the armrest (the back surface side of the ornament member) by the connection part being inserted into an interface gap between the armrest and the ornament member. A thermostat is mounted on the second bonded part.

2 Claims, 5 Drawing Sheets

(52) U.S. Cl.
CPC ............... *B60R 2013/0281* (2013.01); *B60R 2013/0287* (2013.01); *B60R 2013/0293* (2013.01)

(58) Field of Classification Search
CPC .... B60R 2013/0287; B60R 2013/0293; H05B 1/0236
See application file for complete search history.

(56) References Cited

FOREIGN PATENT DOCUMENTS

| | | | | |
|---|---|---|---|---|
| EP | 0408202 A2 | * | 1/1991 | ............ B29C 41/46 |
| JP | H02-029814 U | | 2/1990 | |
| JP | H05-016427 U | | 3/1993 | |
| JP | 2007-118851 A | | 5/2007 | |
| WO | WO-9631369 A1 | * | 10/1996 | ......... B60R 13/0243 |
| WO | 2004/105440 A2 | | 12/2004 | |

* cited by examiner

AUTOMOBILE DOOR TRIM

CROSS-REFERENCE TO RELATED APPLICATIONS

This application is a National Stage Entry application of PCT International Application No. PCT/JP2017/034853, filed on Sep. 27, 2017, the entire contents of which are hereby incorporated by reference.

BACKGROUND

1. Technical Field

The present invention relates to an automotive door trim (hereinafter referred to as "the door trim") mounted as an interior trimming member on the inner side of a vehicle body door panel. In particular, the present invention relates to a door trim which suitably attains reducing the number of components and manufacturing costs of the door trim as a whole; reducing the power consumption for raising the temperature at the surface of the door trim to a predetermined temperature; increasing the temperature rising speed at the surface of the door trim; and unifying a door trim molding die, the surface of which door trim has the appearance free from irregularities attributed to unevenness.

2. Description of the Background

A door trim as an interior trimming member is mounted internally on a vehicle body door panel. The door trim of this type for some vehicle models has a heater function. The door trim having the heater function is disclosed in, for example. Japanese Unexamined Patent Application No. 2007-118851 (hereinafter referred to as Patent Literature 1) or Japanese Unexamined Utility Model Application No. 2-29814 (hereinafter referred to as Patent Literature 2).

A door trim (2) disclosed in Patent Literature 1 includes a planar heater (4) at its extra-cabin surface (on its back surface side). A door trim (1) disclosed in Patent Literature 2 employs a planar heater (4) equipped with a thermostat (8).

However, the door trim (2) disclosed in Patent Literature 1 has the planar heater (4) disposed on its extra-cabin surface (back surface) of the door trim (2) (see abstract and FIG. 2 in Patent Literature 1). Accordingly, the temperature rising speed at the front surface of the door trim (2) (the intra-cabin surface) is slow. Furthermore, in order for the front surface of the door trim (2) to reach a predetermined temperature, the specific power ($W/m^2$) in heating with the planar heater (4) must be set to a high value. This disadvantageously increases the power consumption of the planar heater (4).

In the conventional door trim (2) disclosed in Patent Literature 1, a portion in the extra-cabin surface (the back surface) in the door trim (2) where the planar heater (4) is mounted is a curved surface. Accordingly, the planar heater (4) must closely adhere to the door trim (2) so as to avoid poor thermal conductivity between the door trim (2) and the planar heater (4). The close adhesion necessitates a holding plate (7) and work of mounting the holding plate (7), which disadvantageously increases the number of components and the manufacturing costs of the door trim as a whole.

In the conventional door trim (1) disclosed in Patent Literature 2, the thermostat (8) is mounted on the back surface of the planar heater (4). The door trim (1) is provided with a receive hole (10) for the thermostat (8) to be inserted. Accordingly, the molding die for the door trim (1) must be capable of molding such a receive hole (10). That is, a molding die dedicated to the heater-equipped door trim must be separately provided. A door trim without a heater and a heater-equipped door trim cannot be manufactured using the same molding die, that is, a unified door trim molding die cannot be used.

In the foregoing, the reference characters in parentheses correspond to those in respective patent literatures.

BRIEF SUMMARY

An object of the present invention is to provide a door trim which suitably attains reducing the number of components and manufacturing costs of the door trim as a whole; reducing the power consumption for raising the temperature at the surface of the door trim to a predetermined temperature; increasing the temperature rising speed at the surface of the door trim; and unifying a door trim molding die, the surface of which door trim has the appearance free from irregularities attributed to unevenness.

In order to achieve the object described above, the present invention provides an automotive door trim including: an armrest; an ornament member coupled to the armrest; and a planar heater configured to warm the armrest or the ornament member. The planar heater is disposed between a resin core member and a surface member which form the armrest or the ornament member, and includes a nonwoven fabric and a heating wire fixed to the nonwoven fabric. The nonwoven fabric includes: a first bonded part bonded onto a front surface side of the resin core member of the armrest or the ornament member; a second bonded part bonded onto a back surface side of the resin core member of the armrest or the ornament member; a connection part functioning as means for connecting between the first bonded part and the second bonded part, and means for routing the second bonded part to be disposed on a back surface side of the armrest or a back surface side of the ornament member by being inserted into an interface gap between the armrest and the ornament member, and a thermostat connected in series to the heating wire and mounted on the second bonded part. The heating wire is disposed to extend from the second bonded part to the first bonded part via the connection part. In the first bonded part, the heating wire functions as a first heating part configured to warm the armrest or the ornament member. In the second bonded part, the heating wire functions as a second heating part configured to warm the thermostat.

In the present invention, the interface gap between the armrest and the ornament member may be provided with a cutout part corresponding to a width of the connection part. The connection part may be configured to pass through the cutout part.

As described above, the present invention employs, as the specific structure of the door trim, the structure in which the planar heater is disposed between the resin core member and the surface member which form the armrest or the ornament member. This sandwich structure in which the planar heater is interposed between the resin core member and the surface member allows the planar heater to closely adhere to the surface member. Furthermore, the nonwoven fabric of the planar heater freely flexes and deforms along the armrest or the ornament member whose surface may be curved, as compared to a PET film or the like. These features eliminate the necessity of employing a holding plate as a component for holding down the planar heater toward the surface member, which contributes to reducing the number of components and manufacturing costs of the door trim as a whole.

Furthermore, in the present invention, as can be seen from the disposition of the planar heater, the planar heater is configured to directly warm the surface member from the back side of the surface member. This structure efficiently heats the surface member at the front surface (the intra-cabin surface) of the door trim. This realizes a relatively small specific power (W/m$^2$) in heating with the planar heater, contributing to reducing the power consumption for warming the front surface of the door trim to a predetermined temperature, and increasing the temperature rising speed at the front surface of the door trim.

Furthermore, as described above, in the present invention, the nonwoven fabric of the planar heater is specifically structured as follows: the first bonded part and the second bonded part are connected to each other by the connection part 41; the second bonded part is routed to be disposed on the back surface side of the armrest or the back surface side of the ornament member by the connection part being inserted into the interface gap between the armrest and the ornament member; and the thermostat is mounted on the second bonded part. This eliminates the necessity of providing, as described above, the hole for disposing the thermostat (see the receive hole (10) in Patent Literature 2) at the ornament member, for example. Without such a hole, the thermostat is disposed on the back surface side of the ornament member. This eliminates the necessity of providing a molding die capable of molding such a hole, that is, a molding die dedicated to a heater-equipped door trim, and the heater-equipped door trim can be manufactured using a molding die for a door trim without a heater. In summary, the present invention makes it possible to manufacture a door trim without a heater and a heater-equipped door trim using the same molding die, and hence to unify the door trim molding die and to reduce the costs for manufacturing the door trim accordingly.

Furthermore, in the present invention, as can be seen from the disposition of the thermostat described above, the thermostat is disposed on the back surface side of the ornament member or the armrest. This avoids unevenness attributed to the projecting thermostat on the front surface of the armrest or the ornament member, and hence provides the appearance which is free from irregularities attributed to unevenness on the front surface of the door trim.

DETAILED DESCRIPTION

In the following, with reference to the accompanying drawings, a detailed description will be given of the best modes for carrying out the present invention.

Figure 1:
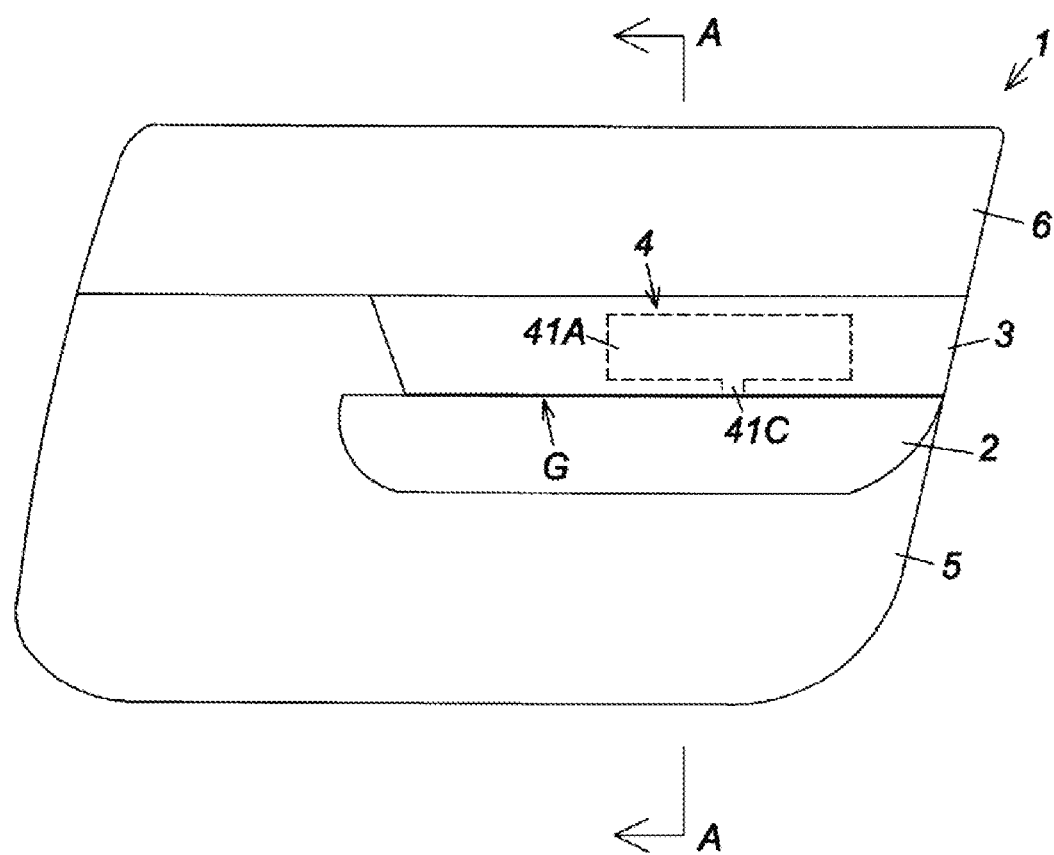
FIG. 1 is a plan view of a door trim to which the present invention is applied as an embodiment of the present invention.
Figure 2:
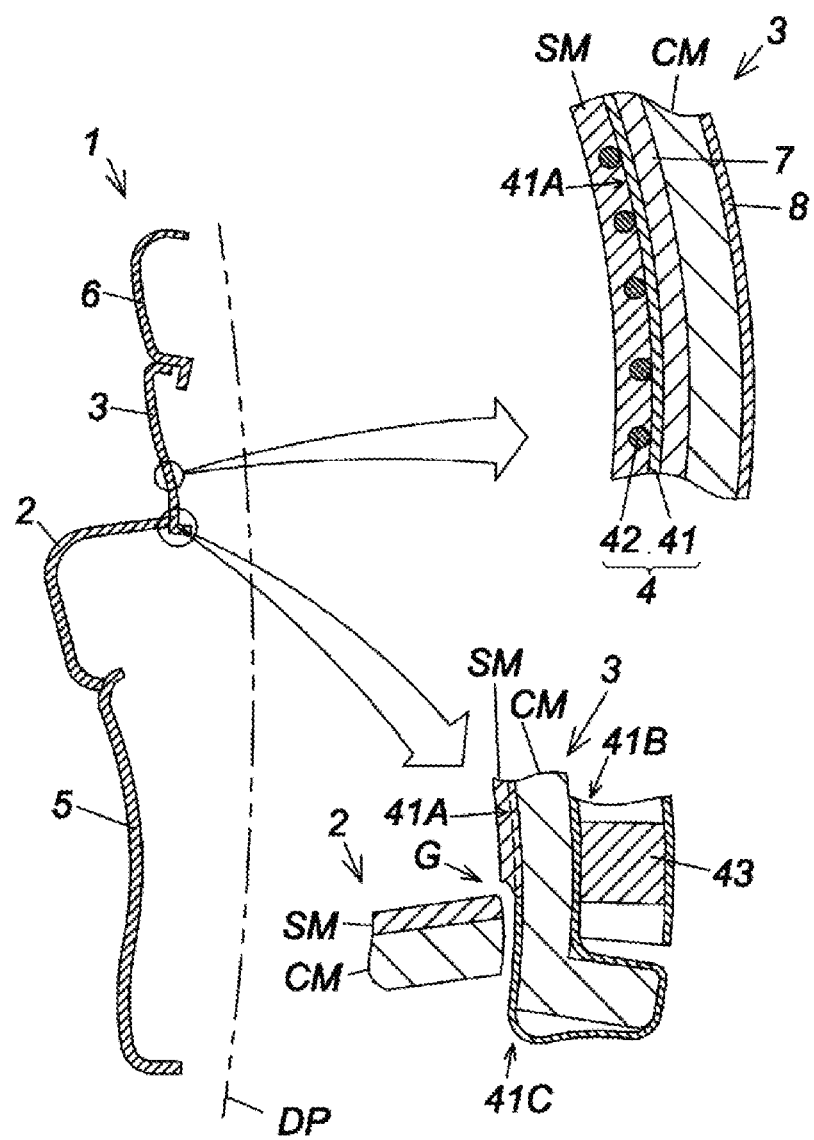
FIG. 2 is a cross-sectional view on arrow A in FIG. 1 and partial enlarged views thereof.
Figure 3:
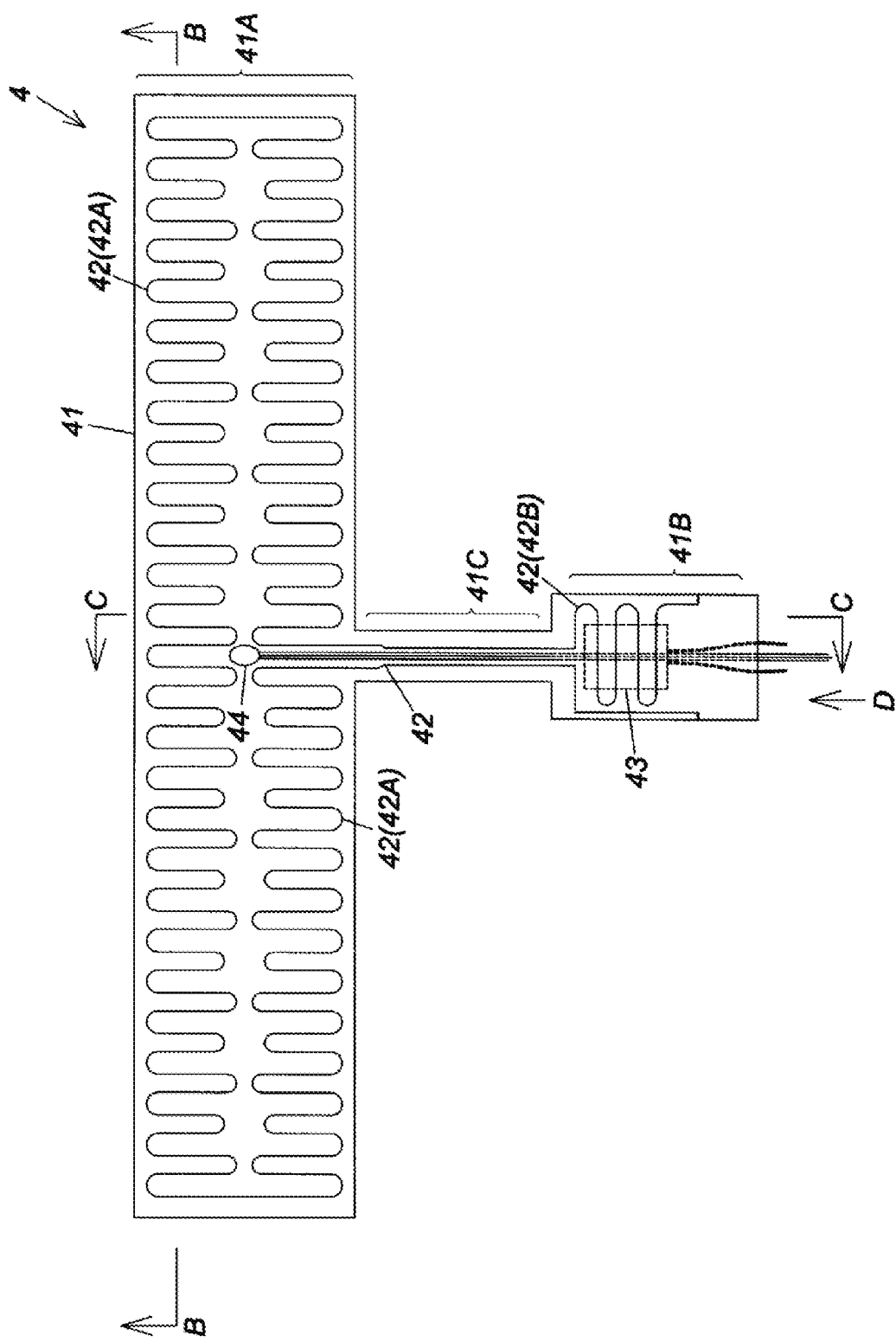
FIG. 3 is a plan view of a planar heater employed in the door trim in FIG. 1.
Figure 4A:
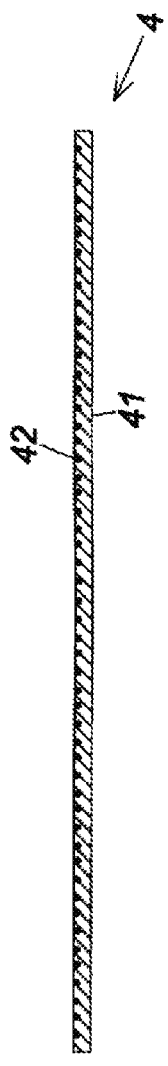
FIG. 4A is a cross-sectional view on arrow B in FIG. 3.
Figure 4D:
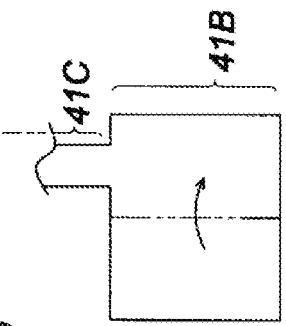
FIG. 4D is an exploded view of a second bonded part of a nonwoven fabric of a planar heater.
Figure 4B:
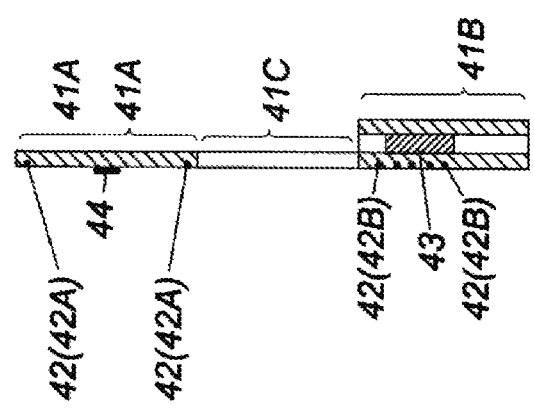
FIG. 4B is a cross-sectional view on arrow C in FIG. 3.
Figure 4C:
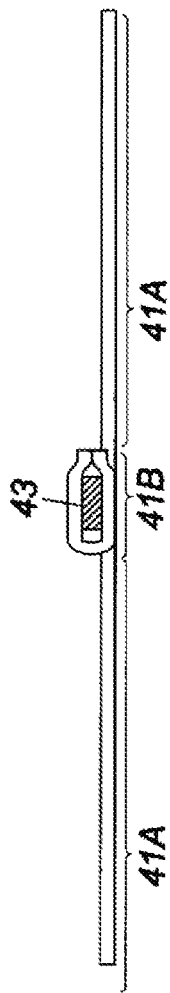
FIG. 4C is a view on arrow D in FIG. 3.

FIG. 1 is a plan view of a door trim to which the present invention is applied as an embodiment of the present invention. FIG. 2 is a cross-sectional view on arrow A in FIG. 1 and partial enlarged views thereof. FIG. 3 is a plan view of a planar heater employed in the door trim in FIG. 1. FIG. 4A is a cross-sectional view on arrow B in FIG. 3. FIG. 4B is a cross-sectional view on arrow C in FIG. 3. FIG. 4C is a view on arrow D in FIG. 3. FIG. 4D is an exploded view of a second bonded part of a nonwoven fabric of a planar heater.

The door trim 1 in FIG. 1 (hereinafter referred to as "the door trim 1 according to the present embodiment") is mounted on the inner side of a vehicle body door panel DP (see FIG. 2). The door trim 1 includes, as its specific door trim components, an armrest 2, an ornament member 3 coupled to the armrest 2, and a planar heater 4 (see FIGS. 2 and 3) configured to warm the ornament member 3.

The door trim 1 according to the present embodiment further includes, as its specific door trim components, a lower door trim part 5 and an upper door trim part 6. Between the lower door trim part 5 and the upper door trim part 6, a coupling component made up of the armrest 2 and the ornament member 3 coupled to each other as described above is set.

With reference to FIG. 2, the armrest 2 and the ornament member 3 are each basically formed of a plate-like resin core member CM and a surface member SM bonded onto the surface of the resin core member CM. The lower door trim part 5 and the upper door trim part 6 are also basically formed similarly.

The door trim components such as the armrest 2, the ornament member 3, the lower door trim part 5, the upper door trim part 6 and the like are molded with resin using a die assembly.

As shown in FIG. 2, the planar heater 4 is disposed between the resin core member CM and the surface member SM of the ornament member 3. The planar heater 4 includes a nonwoven fabric 41 and a heating wire 42 fixed to the nonwoven fabric 41.

With reference to FIG. 2, in the door trim 1 according to the present embodiment, a heat insulating member 7 is disposed between the planar heater 4 and the resin core member CM. On the back surface (the surface opposite to the surface to which the surface member SM is bonded) of the resin core member CM, aluminum foil 8 is disposed. This prevents heat from being radiated from the planar heater 4 toward the vehicle body door panel DP, thereby improving the heating efficiency of the surface member SM with the planar heater 4. The heat insulating member 7 and the aluminum foil 8 are provided as necessary, and may be dispensed with.

As to the scheme of fixing the heating wire 42 to the nonwoven fabric 41, in the door trim 1 in FIG. 1, the heating wire 42 is sewn using a sewing machine to the nonwoven fabric 41. The fixing scheme is not limited thereto.

With reference to FIGS. 3 and 2, the nonwoven fabric 41 includes three functional parts, namely: (1) a first bonded part 41A bonded onto the front surface side of the resin core member CM of the ornament member 3; (2) a second bonded part 41B bonded onto the back surface side of the resin core member CM of the ornament member 3; and (3) a connection part 41C which function as means for connecting between the first bonded part 41A and the second bonded part 41B, and means for routing the second bonded part 41B to be disposed on the back surface side of the ornament member 3 by being inserted into an interface gap G between the armrest 2 and the ornament member 3.

In the door trim 1 according to the present embodiment, while a double-sided tape (not shown) is employed as means for bonding the first bonded part 41A and the second bonded part 41B onto the front surface side of the resin core member CM, the present invention is not limited thereto and they may be bonded by any bonding means other than a double-sided tape.

As shown in FIGS. 1 and 2, the nonwoven fabric 41 includes a thermostat 43 which functions as a breaker apparatus. The thermostat 43 is connected in series to the heating wire 42 and mounted on the second bonded part 41B. In the door trim 1 according to the present embodiment, the thermostat 43 is actuated when the temperature exceeds a set temperature (60° C.), to cut the current flowing through the heating wire 42. The actuation temperature of the thermostat 43 is not limited to 60° C., and may be raised or lowered as necessary.

The nonwoven fabric 41 includes a thermistor 44 as a temperature sensor which is configured to detect the temperature around the surface member SM. The thermistor 44 is disposed about the center of the first bonded part 41A, and connected to a signal input part of a not-shown onboard computer, for example. In this structure, the onboard computer may adjust the heating degree of the planar heater 4 (specifically, the heating degree in the first and second heating parts 42A, 42B) by turning on and off the current flowing through the heating wire 42 according to voltage output signals from the thermistor 44. Note that, the position where thermistor 44 is disposed may be changed as necessary.

As to the structure of mounting the thermostat 43 on the second bonded part 41B, in the door trim 1 in FIG. 1, as shown in FIGS. 4B, 4C, 4D, the second bonded part 41B is folded to be doubled. The thermostat 43 is mounted inside the fold with a not-shown double-sided tape on the second bonded part 41B. Note that, the present invention is not limited to such a structure.

The heating wire 42 is disposed to extend from the second bonded part 41B to the first bonded part 41A via the connection part 41C. In the first bonded part 41A, the heating wire 42 functions as a first heating part 42A configured to warm the ornament member 3. In the second bonded part 41B, the heating wire 42 functions as a second heating part 42B configured to warm the thermostat 43.

In the door trim 1 according to the present embodiment, an exemplary fibrous material of the nonwoven fabric 41 is PET (105 g/m$^2$) fibers. Note that, the present invention is not limited thereto.

In the door trim 1 according to the present embodiment, the heating wire 42 is exemplarily a twist wire of extremely thin heating wires for reducing irregularities attributed to unevenness, specifically, a twist wire of copper-silver alloy wires each having a diameter of 0.05 to 0.08. Note that, the present invention is not limited to such a twist wire. The heating wire 42 may be formed of wires other than copper-silver alloy wires, for example, copper-tin alloy wires, copper magnesium alloy wires or the like.

In the door trim 1 according to the present embodiment, the heat insulating member 7 is exemplarily a slab urethane material having a density of 0.03 g/cm$^3$ and a thickness of 2 mm to 3 mm. Note that, the present invention is not limited thereto.

In relation to the door trim 1 according to the present embodiment described above, an experiment was conducted to measure the surface temperature at the surface member SM, using the planar heater 4 designed to exhibit a specific power (W/m$^2$) in heating of 1300 W/m$^2$ to 1350 W/m$^2$ at a voltage of 14.4 V under an environment condition of an ambient temperature of 0° C. The obtained temperature rising speed data was excellent, showing that the surface temperature at the surface member SM rose from 0° C. to 35° C. or higher in two minutes.

As other embodiment of the present invention, while not shown in the drawings, the first bonded part 41A of the nonwoven fabric 41 may be bonded onto the front surface side of the armrest 2; the second bonded part 41B of the nonwoven fabric 41 may be bonded onto the back surface side of the armrest 2; and the connection part 41C of the nonwoven fabric 41 may function as means for routing the second bonded part 41B to be disposed on the back surface side of the armrest 2 by being inserted into the interface gap G between the armrest 2 and the ornament member 3. In this case, the planar heater 4 is disposed between the resin core member CM and the surface member SM of the armrest 2, and the heating wire 42 functions in the first bonded part 41A as the first heating part 42A configured to warm the armrest 2.

Figure 5:
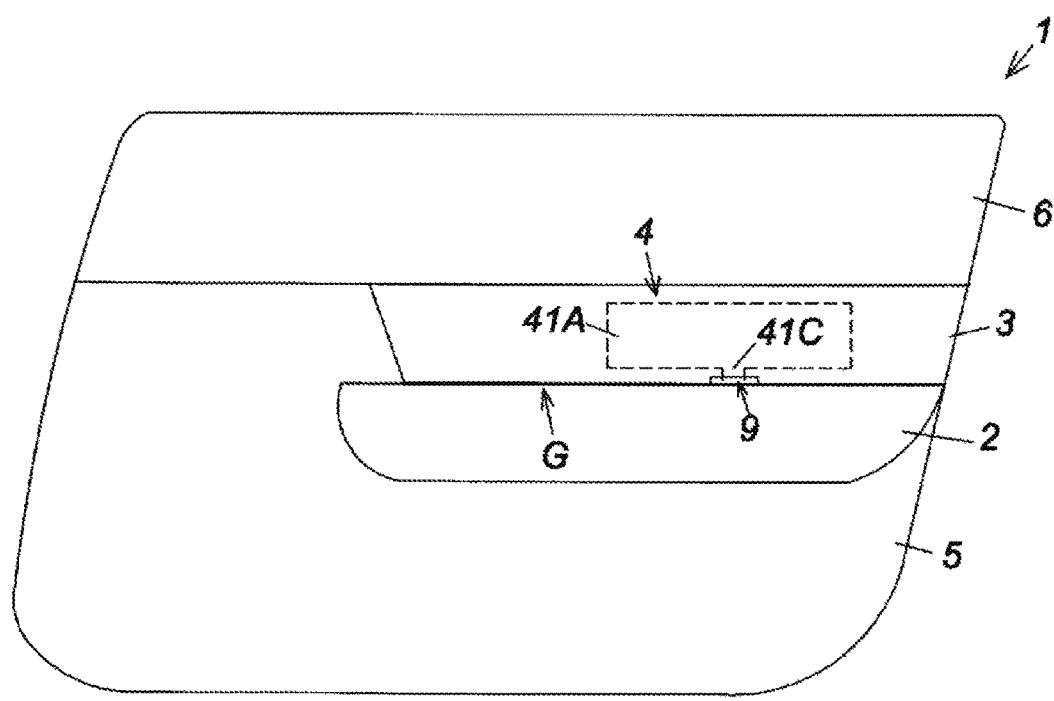
FIG. 5 is a plan view of a door trim to which the present invention is applied as other embodiment of the present invention.

As another embodiment of the present invention, as shown in FIG. 5, a cutout part 9 corresponding to the width of the connection part 41C may be provided at the interface gap G between the armrest 2 and the ornament member 3. Through the cutout part 9, the connection part 41C may pass. The interface gap G is formed at a site where the edge of the armrest 2 and the edge of the ornament member 3 oppose to each other. Therefore, the cutout part 9 may be formed by cutting away one of or both of the respective opposing edges of the armrest 2 and the ornament member 3.

As described above, the door trim 1 according to the present embodiment and other embodiments hereinafter referred to as "the present embodiment and others") employs, as its specific structure, the structure in which the planar heater 4 is disposed between the resin core member CM and the surface member SM which form the armrest 2 or the ornament member 3. This sandwich structure in which the planar heater 4 is interposed between the resin core member CM and the surface member SM allows the planar heater 4 to closely adhere to the surface member SM. Furthermore, the nonwoven fabric 41 of the planar heater 4 freely flexes and deforms along the armrest 2 or the ornament member 3 whose surface may be curved, as compared to a PET film or the like. These features eliminate the necessity of employing a holding plate as a component for holding down the planar heater 4 toward the surface member SM, which contributes to reducing the number of components and manufacturing costs of the door trim 1 as a whole.

In the door trim 1 according to the present embodiment and others, as can be seen from the disposition of the planar heater 4, the planar heater 4 is configured to directly warm the surface member SM from the back side of the surface member SM. This structure efficiently heats the surface member SM at the front surface (the intra-cabin surface) of the door trim 1. This realizes a relatively small specific power (W/m$^2$) in heating with the planar heater 4, contributing to reducing the power consumption for warming the front surface of the door trim to a predetermined temperature, and increasing the temperature rising speed at the front surface of the door trim 1.

In the door trim 1 according to the present embodiment and others, as described above, the nonwoven fabric 41 of the planar heater 4 is specifically structured as follows: 41A and the second bonded part 41B are connected to each other by the connection part 41C; the second bonded part 41B is routed to be disposed on the back surface side of the armrest 2 or the back surface side of the ornament member 3 by the connection part 41C being inserted into the interface gap G between the armrest 2 and the ornament member 3; and the thermostat 43 is mounted on the second bonded part 41B. This eliminates the necessity of providing, as described above, the hole for disposing the thermostat 43 (see the receive hole (10) in Patent Literature 2) at the ornament member 3, for example. Without such a hole, the thermostat 43 is disposed on the back surface side of the ornament member 3. This eliminates the necessity of providing a molding die capable of molding such a hole, that is, a molding die dedicated to a heater-equipped door trim, and the heater-equipped door trim can be manufactured using a molding die for a door trim without a heater. In summary, in relation to the door trim 1 according to the present embodiment and others, a door trim without a heater and a heater-equipped door trim can be manufactured using the same molding die, and hence the door trim molding die is unified and the costs for manufacturing the door trim are reduced accordingly.

In the door trim 1 according to the present embodiment and others, as can be seen from the disposition of the thermostat 43 described above, the thermostat 43 is disposed on the back surface side of the ornament member 3 or the armrest 2. This avoids unevenness attributed to the projecting thermostat 43 on the front surface of the armrest 2 or the ornament member 3, and hence provides the appearance which is free from irregularities attributed to unevenness on the front surface of the door trim.

The present invention is not limited to the embodiments described above, and a person skilled in the art can make various modifications within the technical idea of the present invention.

REFERENCE SIGNS LIST

1: door trim
2: armrest
3: ornament member
4: planar heater
41: nonwoven fabric
41A: first bonded part
41B: second bonded part
41C: connection part
42: heating wire
42A: first heating part
42B: second heating part
43: thermostat
44: thermistor
5: lower door trim part
6: upper door trim part
7: heat insulating member
8: aluminum foil
9: cutout part
CM: resin core member
DP: vehicle body door panel
G: interface gap between armrest and ornament member
SM: surface member

The invention claimed is:

1. An automotive door trim comprising:
an armrest;
an ornament member coupled to the armrest; and
a planar heater configured to warm the armrest or the ornament member, wherein
the planar heater is disposed between a resin core member and a surface member which form the armrest or the ornament member, and includes a nonwoven fabric and a heating wire fixed to the nonwoven fabric,
the nonwoven fabric includes:
a first bonded part bonded onto a front surface side of the resin core member of the armrest or the ornament member;
a second bonded part bonded onto a back surface side of the resin core member of the armrest or the ornament member;
a connection part functioning as means for connecting between the first bonded part and the second bonded part, and means for routing the second bonded part to be disposed on a back surface side of the armrest or a back surface side of the ornament member by being inserted into an interface gap between the armrest and the ornament member; and
a thermostat connected in series to the heating wire and mounted on the second bonded part,
the heating wire is disposed to extend from the second bonded part to the first bonded part via the connection part,
in the first bonded part, the heating wire functions as a first heating part configured to warm the armrest or the ornament member, and
in the second bonded part, the heating wire functions as a second heating part configured to warm the thermostat.

2. The automotive door trim according to claim 1, wherein
the interface gap between the armrest and the ornament member is provided with a cutout part corresponding to a width of the connection part, and
the connection part is configured to pass through the cutout part.

* * * * *